US009733488B2

(12) United States Patent
Ambler et al.

(10) Patent No.: US 9,733,488 B2
(45) Date of Patent: Aug. 15, 2017

(54) COMPOSITE CONSTRUCTED OPTICAL LENS

(71) Applicant: Younger Mfg. Co., Torrance, CA (US)

(72) Inventors: David Mark Ambler, Rancho Palos Verdes, CA (US); Adam Ahmad Barzak, Anaheim, CA (US); Lingbing Lynn Zhao, Torrance, CA (US)

(73) Assignee: Younger Mfg. Co., Torrance, CA (US)

( * ) Notice: Subject to any disclaimer, the term of this patent is extended or adjusted under 35 U.S.C. 154(b) by 56 days.

(21) Appl. No.: 14/942,873

(22) Filed: Nov. 16, 2015

(65) Prior Publication Data

US 2017/0139230 A1   May 18, 2017

(51) Int. Cl.
| | |
|---|---|
| G02C 7/00 | (2006.01) |
| G02C 7/02 | (2006.01) |
| G02C 7/10 | (2006.01) |
| G02C 7/12 | (2006.01) |
| G02C 11/00 | (2006.01) |
| G02C 7/06 | (2006.01) |

(52) U.S. Cl.
CPC ............... *G02C 7/022* (2013.01); *G02C 7/00* (2013.01); *G02C 7/02* (2013.01); *G02C 7/06* (2013.01); *G02C 7/102* (2013.01); *G02C 7/12* (2013.01); *G02C 11/10* (2013.01); *G02C 2202/16* (2013.01)

(58) Field of Classification Search
CPC . G02C 7/022; G02C 7/06; G02C 7/00; G02C 7/02; G02C 7/102; G02C 7/12; G02C 11/10
USPC ............ 351/159.59, 159.01, 159.41, 159.56; 428/423.1; 427/162
See application file for complete search history.

(56) References Cited

U.S. PATENT DOCUMENTS

| | | |
|---|---|---|
| 3,248,460 A | 4/1966 | Naujokas |
| 4,645,317 A | 2/1987 | Frieder et al. |
| 4,758,448 A | 7/1988 | Sandvig et al. |
| 5,405,557 A | 4/1995 | Kingsbury |
| 5,512,371 A | 4/1996 | Gupta et al. |
| 5,523,030 A | 6/1996 | Kingsbury |

(Continued)

FOREIGN PATENT DOCUMENTS

EP   1453662 B1   10/2008

OTHER PUBLICATIONS

Transitions Signature VII Flat Top 28 Polycarbonate Composite, marketing flyer, May 7, 2015, Younger Optics, Torrance, CA.

(Continued)

*Primary Examiner* — William R Alexander
(74) *Attorney, Agent, or Firm* — Sheppard, Mullin, Richter & Hampton LLP

(57) ABSTRACT

The present invention describes composite constructed ophthalmic lenses comprising at least two layers of optical materials that provide a composite structure over a practical vision zone of the lens product, are identifiably disparate from each other, and are integrally bonded to each other such that the adhesion of the first layer to the second layer exceeds a ranking of at least 3 when tested according to specified tests. In a preferred embodiment, one layer comprises thermoplastic polycarbonate and the second layer comprises polyurea-urethane material and one or more additives. The first layer may comprise a polarizer. The composite lens may also comprise coatings or other components.

20 Claims, 5 Drawing Sheets

(56) References Cited

U.S. PATENT DOCUMENTS

| | | | |
|---|---|---|---|
| 5,531,940 A | 7/1996 | Gupta et al. | |
| 5,645,767 A | 7/1997 | Van Gemert | |
| 6,127,505 A | 10/2000 | Slagel | |
| 6,156,394 A * | 12/2000 | Schultz Yamasaki | G21K 5/04 427/162 |
| 6,256,152 B1 | 7/2001 | Coldrey et al. | |
| 6,367,930 B1 * | 4/2002 | Santelices | G02B 5/23 351/159.61 |
| 6,413,641 B1 | 7/2002 | Yamasaki et al. | |
| 6,531,076 B2 | 3/2003 | Crano et al. | |
| 6,570,714 B2 | 5/2003 | Soane et al. | |
| 6,585,373 B2 | 7/2003 | Evans et al. | |
| 6,759,090 B2 | 7/2004 | Loshak et al. | |
| 6,835,425 B2 * | 12/2004 | Fukuda | C23C 4/10 427/162 |
| 7,002,744 B2 | 2/2006 | Evans et al. | |
| 7,138,187 B2 | 11/2006 | Breton et al. | |
| 7,465,414 B2 | 12/2008 | Knox et al. | |
| 7,820,082 B2 | 10/2010 | Berzon et al. | |
| 7,892,459 B2 | 2/2011 | Schlunt et al. | |
| 8,029,707 B2 | 10/2011 | Berzon et al. | |
| 8,075,132 B2 | 12/2011 | Blum et al. | |
| 9,081,130 B1 | 7/2015 | Fan et al. | |
| 2003/0096935 A1 | 5/2003 | Nagpal et al. | |
| 2004/0125337 A1 * | 7/2004 | Boulineau | B29C 45/14811 351/159.62 |
| 2004/0188873 A1 | 9/2004 | Ono et al. | |
| 2005/0089630 A1 * | 4/2005 | Schlunt | G02B 5/23 427/162 |
| 2005/0233153 A1 * | 10/2005 | Qin | B32B 27/18 428/423.1 |
| 2008/0146759 A1 * | 6/2008 | Takashima | C08G 18/38 526/289 |
| 2012/0236255 A1 * | 9/2012 | Jiang | B29D 11/0073 351/159.42 |
| 2013/0329184 A1 * | 12/2013 | Barzak | G02C 7/102 351/159.56 |
| 2014/0272426 A1 * | 9/2014 | Vu | C08G 18/44 428/423.3 |
| 2015/0140324 A1 * | 5/2015 | Kishimoto | C09J 7/0267 428/336 |
| 2015/0152294 A1 * | 6/2015 | Sherman | C09J 7/00 428/200 |

OTHER PUBLICATIONS

Transitions Signature VII Flat Top 28 Polycarbonate Composite Processing Guidelines, technical guide, Younger Optics, May 7, 2015, Younger Optics, Torrance, CA.

\* cited by examiner

COMPOSITE CONSTRUCTED OPTICAL LENS

CROSS-REFERENCE TO RELATED APPLICATION

None.

FEDERALLY SPONSORED RESEARCH OR DEVELOPMENT

Not applicable.

JOINT RESEARCH AGREEMENT

Not applicable.

SEQUENCE LISTING

Not applicable.

PRIOR USE

Sales of the invention by the inventors began Nov. 17, 2014.

BACKGROUND OF THE INVENTION

Field of the Invention

The field of the invention relates generally to ophthalmic lens products and more specifically to lenses and lens blanks for eyewear, in which the lenses have a composite structure consisting of at least two disparate materials integrally bonded to each other.

Description of the Related Art

Ophthalmic lenses are commonly used to correct vision errors, aberrations and focusing deficiencies caused by age, disease or other factors. In addition to correcting physiological vision problems, ophthalmic lenses and eyewear may also be used to ameliorate physical or environmental conditions (such as glare, variable lighting, high intensity light, dust, condensation, etc.) that can affect sight. Eyewear may also incorporate aesthetic features for fashion and style.

In addition, ophthalmic lenses and eyewear must meet certain physical and performance requirements, such as impact resistance, temperature and chemical stability, structural integrity, durability, etc. For eyeglass lenses, it is important that the lenses and any coatings or features added to the lenses do not crack, chip, delaminate, discolor, haze or become detached from the lenses throughout the lifetime of use. These issues are particularly important to test and optimize when lenses comprise different materials, such as photochromic coatings; anti-reflective, absorptive or blocking coatings; filters; embedded films, layers, wafers or structures (such as polarizers, electro-active or conductive materials, displays, cameras, sensors, and the like), or combinations of two or more dissimilar optical materials.

The possible benefits of combining two or more optical materials to create a composite ophthalmic lens have been recognized for years. This has given rise to much work on coatings, embedded layers, inserts, and other layered materials. For example, U.S. Pat. Nos. 3,248,460 and 5,512,371 describes similar or different optical materials being added as discrete layers or structures to a base lens or preform, with the goal to provide other optical properties, such as a multifocal feature. U.S. Pat. Nos. 5,405,557 and 5,523,030 describe methods of making layered optical articles from at least two materials, one of which includes photochromic agents, but both of which are sufficiently similar in chemical composition that they create a homogenously layered article with no distinct phase boundary. In addition, polymeric optical materials have been proposed or are currently in use and comprise mixtures of various polymer systems, or comprise polymer(s) with added particles, fillers, capsules or other small structures of different chemical structure than the main polymer(s).

A significant and continued challenge is how to keep disparate materials sufficiently joined, without compromising their intended optical or other beneficial properties, throughout the lifetime of the ophthalmic lens. This is not a trivial challenge. The materials that are desirable to combine for optical or structural enhancement may have vastly different thermal, chemical, or mechanical response. For example, thermoplastics and thermoset materials by definition have distinctly different temperature responses and thermal structural integrities. In addition, some optical materials are much less affected by ultraviolet exposure than others, which can cause extreme and unacceptable damage in the form of embrittlement, yellowing or performance degradation (e.g., photochromic fatigue). Maintaining good optical performance of a composite ophthalmic lens can become even more difficult when common functional coatings (such as inorganic anti-reflective multilayer thin film coatings) are added to the lens. The composite structure alone, and in combination with common coatings, must remain well bonded and not suffer unacceptable damage, delamination, cracking, crazing or other defects when the lens is surfaced, polished, edged, drilled, tensioned or flex-fit into a spectacle frame. Additional or cumulative damage may occur from continued frame stress, or from other mechanical or environmental forces that act on the lens during everyday use. Any interface between dissimilar materials can easily become a weak point for initiation or propagation of damage or delamination.

Various techniques have been proposed to increase adhesion between dissimilar materials. For example, U.S. Pat. Nos. 6,256,152 B1, 6,531,076 B2, 6,585,373 B1 and 6,759,090 B2 describe various surface treatments that may be useful to improve adhesion between dissimilar layers or materials in composite optical parts. U.S. Pat. Nos. 6,413,641 B1 and 7,138,182 B2 further describe particular changes in the types or concentrations of chemical species or reactive groups that are present on polarizing films (or on inert polyethylene terephthalate films) and that may lead to improved adhesion with other optical materials. These varied prior attempts toward improved adhesion may point the way towards some candidate techniques, but also illustrate that neither a single nor an obvious choice of treatment, or of structural change, will universally result in beneficial adhesion. In fact, these patents indicate that notably different techniques and/or various compositional, structural or mechanical changes may be required to effect better performance. This will be dependent on the materials involved as well as the robustness of adhesion desired. For instance, if it is anticipated that the lenses may be exposed to extremes of temperature (such as Arctic conditions), different mechanical and temperature stabilities may be required as compared to "office lenses," which are eyeglasses with the prescription optimized for a limited intermediate distance-viewing range suitable for computer work in an office setting. In addition, adhesion levels that may have been acceptable in previous eyeglass configurations may no longer be sufficient given current and evolving technologies. There are now more methods to process lens blanks into lenses, and more methods to secure lenses in eyeglass frames, given the advent of digital surfacing, 3D printing, rimless frames and other technology advancements. In addition, other components, such as displays, cameras, sensors, wireless electronics, connectors and displays that contain very dissimilar materials from typical eyeglass lenses and exhibit markedly different mechanical, physical and chemical behaviors from lenses, are increasingly being incorporated into ophthalmic lenses and are expected to perform reliably despite these new environments and multiple demands.

Thus, it is important to achieve and verify adhesion and lens integrity so that it is possible to create composite lenses of dissimilar materials with sufficient bonding to endure ophthalmic lens processing and provide good assurance of long-term performance for the patient.

SUMMARY OF THE INVENTION

The present invention resides in a composite eyewear lens comprised of at least a first layer of a first optical material and at least a second layer of a second optical material, such that the two layers provide a composite structure over at least a practical vision zone of the lens product, are identifiably disparate, and are integrally bonded to each other such that the adhesion of the first layer to the second layer exceeds a ranking of at least 3 when it is tested according to the Screwdriver Delamination test.

In a preferred embodiment, the first layer is comprised of thermoplastic polycarbonate. In another preferred embodiment, the first layer has a refractive index of at least 1.56 and comprises an optical material containing sulfur.

In a preferred embodiment, the second layer comprises one or more additives selected from the group of photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors and selective light absorbers. In one preferred embodiment, the second layer comprises at least one photochromic.

In another preferred embodiment, the first and second layers provide a composite structure over a practical vision zone of the lens product comprising a round region approximately centered on the pupil of the eye and at least 18 mm in diameter when the composite lens is mounted in a frame and is in use. In another preferred embodiment, the composite constructed eyewear lens is multifocal.

In another preferred embodiment, the composite lens comprises identifiably disparate first and second layers comprising detectable differences that are measurable by analytical techniques selected from Fourier transform-infrared spectroscopy, differential scanning calorimetry, thermogravimetric analysis, visible microscopy, and visible light spectroscopy.

In an alternative embodiment, the composite lens is comprised of at least a first layer of a first optical material and at least a second layer of a second optical material, such that layers are identifiably disparate from each other, and wherein the first and second layers are integrally bonded to each other such that the adhesion of the first layer to the second layer exceeds at least 3 when tested according to the Pressure Delamination test.

In another preferred embodiment, the second layer of the composite lens further comprises a polyurea-urethane material that comprises one or more additives selected from photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers.

In another preferred embodiment, the first layer further comprises a polarizer selected from the group of linear, gradient linear, circular, elliptical and variable polarizers.

In another preferred embodiment, the composite constructed optical lens comprises at least one component selected from the group of polarizers, displays, cameras, sensors, transmitters, receivers, electrical contacts, wireless devices and decorations. In another preferred embodiment, the composite constructed optical lens further comprises one or more additional coatings selected from the group of hard coatings, hydrophobic coatings, anti-fog coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings and UV light-filtering coatings.

In a preferred embodiment, the second layer has a thickness in the range of about 200 micrometers to about 2 millimeters.

DETAILED DESCRIPTION OF THE PREFERRED EMBODIMENTS

Figure 1:
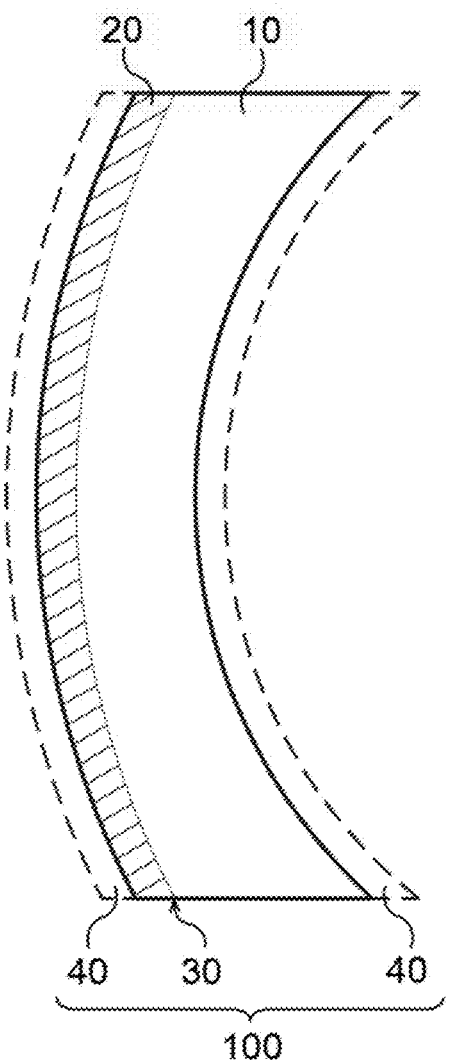
FIG. 1 shows a schematic side perspective view of a preferred embodiment of the invention.

The invention is a composite constructed optical lens product comprised of at least two layers of optical material, the two layers being identifiably disparate from each other, but the two layers providing a composite structure over at least a practical vision zone of the lens. In addition, the two layers are integrally bonded to each other such that the adhesion of the first layer to the second layer can be verified by one or more analytical test techniques, and the adhesion exceeds specific values when tested in a controlled manner according to the test details described.

Ophthalmic lenses and lens blanks are optical products intended for use with the human eye, and may include products for spectacle or other eyewear frames, contact lenses and intraocular lenses. The preferred embodiments of this invention are ophthalmic lenses and lens blanks (including both semi-finished and finished configurations) intended for eyewear frames, designated for convenience of description as "eyewear lens products." Ophthalmic-quality lenses and lens blanks are products with sufficient structural integrity that they maintain the necessary prescribed optical power of the finished eyewear lens, whether that prescribed power is zero (plano), plus, minus or multifocal. Eyewear frames for use with eyewear lens products include spectacle frames, rims, mountings, goggles, helmets, carriers, visors or other structures designed to hold lenses in front of the user's eyes. Eyewear lens blanks are products that are made of materials and designs suitable for ophthalmic eyewear lenses, but are not in final form for a wearer's use. Such lens blanks need to be further shaped or modified to produce a prescription or non-prescription optical power, or to fit within an eyewear frame. For example, many eyewear lens blanks have one surface that is curved suitably for mounting in eyewear frames and supplying some ophthalmic attributes, but the other, opposite surface needs to be ground and polished to complete the full prescription power required by the individual wearer. Such eyewear lens blanks are known in the art as "semi-finished" lens blanks. In contrast, "finished" lenses and lens blanks are recognized in the art as lenses that have the final corrective power and suitable lens thicknesses for eyeglass frames, but may need to be edged to the correct frame shape for mounting. Often eyewear lenses or lens blanks are provided in larger diameters than many eyewear frames, such that they may be custom-edged down to the final shape and size needed to fit a wearer's chosen frame.

Composite constructed optical lens products may be desirable for ophthalmic lenses and lens blanks, and particularly for eyewear lens products, because the combination of different materials may provide more freedom in lens design, and can provide unique or enhanced optical, mechanical, chemical or physical performance. For example, it is desirable to provide photochromic polycarbonate eyewear lenses. However, polycarbonate injection-molding requires high temperatures to melt, extrude and shape ophthalmic optical lens products. These molding conditions are incompatible with many temperature-sensitive materials, and will irreparably damage, bleach or discolor many photochromic agents. Thus, even though polycarbonate is commonly used for eyewear lenses, many photochromic agents cannot be incorporated into the standard manufacturing process. Instead, other approaches have been used to try to produce polycarbonate lenses with photochromic performance, such as overcoating a formed polycarbonate lens, or embedding a protected photochromic film in a wafer and joining the wafer to the polycarbonate material. The problem with such alternative approaches is often poor adhesion between the added elements that may be manifested immediately or after an unacceptably short time in use.

One preferred embodiment of the invention provides an alternative approach to this specific need: create a composite constructed optical lens with a polycarbonate base lens substrate, and a photochromic layer of a different optical material integrally bonded to the polycarbonate base. This approach provides the freedom to use an optical material that can readily incorporate photochromic agents, rather than the problematic polycarbonate. However, substantial problems were encountered in trying to achieve and maintain adequate adhesion between the thermoplastic polycarbonate and the very different material of the photochromic layer. In the process of addressing this one persistent need, it was recognized that the invention had wider application than just polycarbonate lenses with photochromic response: the combination of disparate layers in an integrally bonded composite structure, verified by testing, could be used very advantageously for additional eyewear lens products comprising other materials and other lens properties.

As indicated previously, the literature details many different treatments or processes that may be attempted to increase adhesion. However, in order to evaluate which of these approaches are most effective, tests are needed to measure or rank bonding performance. This may involve long-term or accelerated exposure to passive or active conditions that are expected to degrade the bond integrity of the lens. It may also require ways to probe the strength of the bond under various forces or actions.

Through much work and experimentation, key measurements were defined to characterize and verify integral bonding between disparate layers of a composite optical lens, such that one may have good confidence in the integrity and stability of the composite construct during initial processing and throughout continued use. The research undertaken on the exemplary photochromic polycarbonate composite lens led to further work on other composite ophthalmic eyewear lens structures, and resulted in additional development of composites with verifiable integral bonding.

In a preferred embodiment, the composite constructed eyewear lens product comprises at least two identifiably disparate layers of optical materials. ("Identifiably disparate" means that the layers can be demonstrably distinguished by visual inspection or by standard analytical laboratory techniques.) These two layers are shown in FIG. 1 as 10 and 20, respectively. For convenience of reference and understanding, layer 20 identifies the layer of the composite constructed lens that is closer to the outer surface of the lens when mounted in an eyewear frame (that is, the layer farther from the wearer's eye when the eyewear are in use), and layer 10 is the inner layer of the composite constructed lens, closer to the wearer's eye when worn. These layers may comprise polymeric layers, but extremely thin glass (sometimes called micro-glass) may also be used for one or more of the layers. Layers 10 and 20 may also comprise mixed organic and inorganic materials of crystalline, amorphous or polymeric structures, and may each contain other additives to modify their optical, physical or chemical properties. For ophthalmic lens use, and particularly for eyewear lens products, these layers should exhibit low scatter and haze such that clear images may be seen when objects are viewed through them. In preferred embodiments, layers 10 and 20 are transparent, but may transmit significantly less than 100% of visible light due to optical filtering properties.

There are several standard techniques that can be used to determine whether the layers are "identifiably disparate." Such standard techniques include, for example, Fourier transform-infrared (FT-IR) spectroscopy to identify chemical structure and functional chemical bond differences; visible light spectroscopy (380 nm-780 nm) to detect color and light transmittance, reflectance and absorptance differences; thermal analysis techniques, which are particularly useful for detecting characteristic phase changes or thermal effects in polymeric systems; and other chemical and physical analysis techniques. In addition, some layers will appear identifiably disparate to visual inspection with the unaided eye (e.g., tinted vs. clear materials, or materials with two different refractive indices that bend light at visibly different angles), or with the aid of a microscope (e.g., physical differences discernible in each layer, such as different crystalline structure, or the inclusion of other species or components within the polymer matrix).

Figure 2:
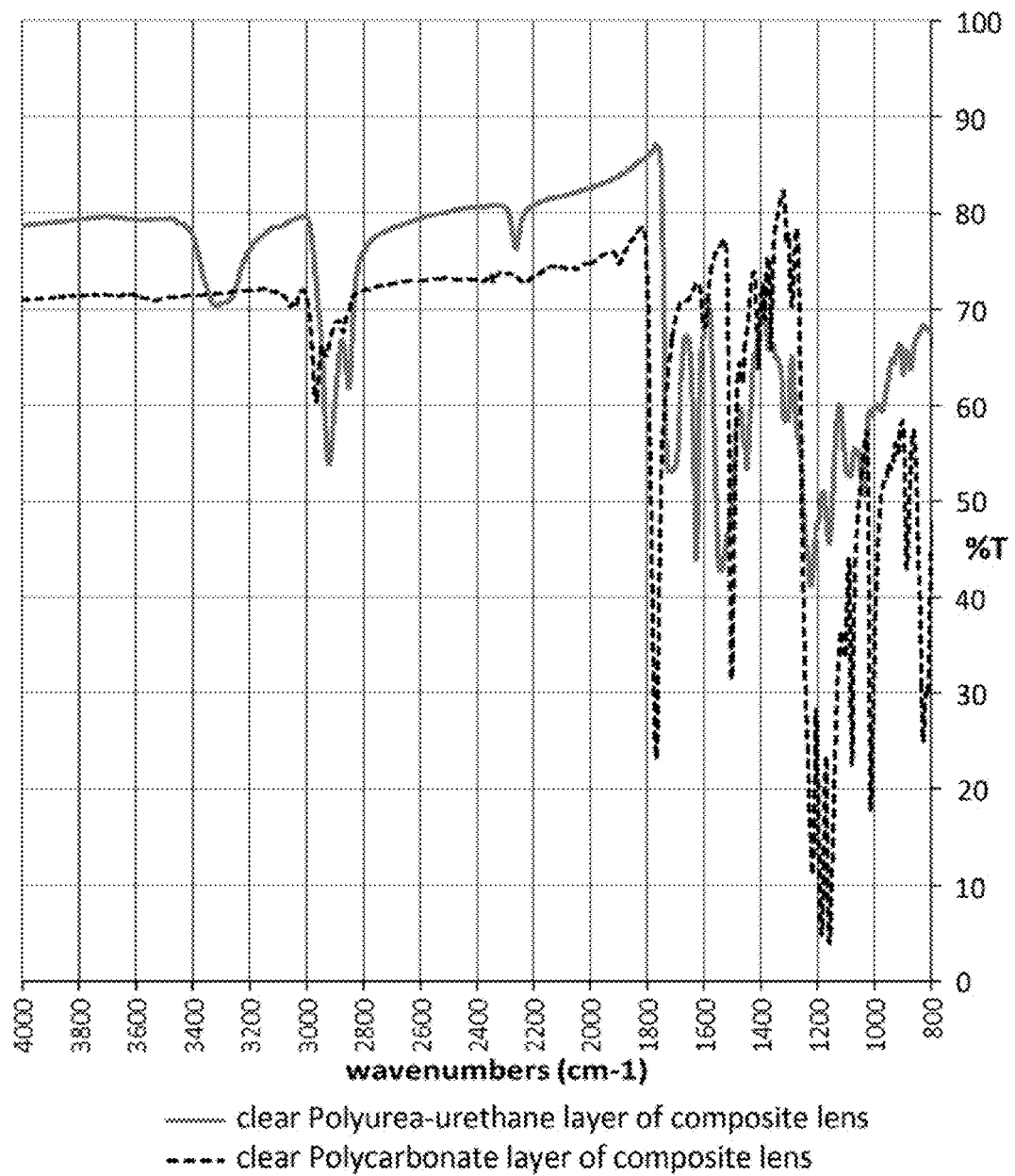
FIG. 2 shows the FT-IR spectral analysis of two layers in one exemplary embodiment of the invention.

For example, consider a composite constructed eyewear lens product with a first layer comprised primarily of thermoplastic polycarbonate, and a second layer comprised of polyurea-urethane optical material, such as those materials and processes described in U.S. Pat. Nos. 6,127,505 and 7,002,744 B2. (In another embodiment, the polyurea-urethane material may contain photochromic agents, such as the material described in U.S. Pat. No. 6,531,076 B2.) These two layers have different chemistries, as indicated by the names, and the different chemical compositions of each layer can be easily detected by standard Fourier transform-infrared (FT-IR) spectroscopy. This is clearly observed in FIG. 2, which shows the infrared spectral scans from 4000-800 cm$^{-1}$ obtained by attenuated total reflectance FT-IR for a clear polyurea-urethane layer (solid line) and the adjacent layer of clear thermoplastic optical-quality polycarbonate (dotted line) in a composite constructed lens. FIG. 2 shows the different functional groups within each of these polymer systems, with their characteristic absorption bands in different wavelength regions across the infrared spectrum. The peak for the polyurea-urethane material near 2260 cm$^{-1}$ is characteristic of that material's —NCO bond, while the peak near 1770 cm$^{-1}$ observed for the polycarbonate layer is characteristic of its C=O bond. Other distinctive and characteristic absorption bands for each of the materials may be identified throughout the infrared region.

In another example, the two identifiably disparate layers may be identified by visible light spectroscopy, which will show characteristic absorption features associated with the photochromic dyes, other dyes, tints and pigments, and/or absorbers and stabilizers added to either of the materials. For instance, polycarbonate material used for ophthalmic lenses often includes additives to improve its ultraviolet (UV) stability and impart a slightly blue tint to the product (so that it will not look yellow). These additives often show a limited but easily detected absorption feature near 555 nm, and this spectral feature can identify the particular polycarbonate material. As another example, most photochromic dyes have strong absorbance in the UV region, and therefore, show enhanced absorption below about 400 nm, even in the unactivated state. This may impart an identifiably disparate UV-visible spectral signature to a lens material that comprises such photochromic dyes vs. the same lens material without such dyes.

Layers 10 and 20 may also be shown to be identifiably disparate by thermal analysis techniques such as differential scanning calorimetry (DSC), thermogravimetric analysis (TGA) and thermomechanical analysis (TMA). Such techniques identify characteristic temperature dependencies of materials and are particularly useful in differentiating polymeric systems. For example, TGA will detect crystallization and decomposition temperatures, which will be distinctly characteristic and identifiable for different polymer systems. Phase changes, such as the glass transition, and exothermic or endothermic reactions or responses of polymeric systems, can be traced by DSC. The temperature at which such events occur, as well as the amount of energy associated with the change, is another identifiable characteristic of the particular polymer system.

These and other analytical techniques may be used to identify layers 10 and 20 made of two different optical materials with disparate chemistries. Exemplary optical materials for use in the composite constructed optical lens comprise organic polymer systems such as polyurea-urethanes, polyurethanes, polythiourethanes, thermoplastic polycarbonates, hard resin thermoset plastics [based on polyol(allyl carbonate) polymerization, and particularly on reactions of diethylene glycol bis(allyl carbonate)], polyacrylates, polymethacrylates, sulfur-containing polymers with refractive indices higher than about 1.56, polystyrenes, polyamides and other optical polymers. Each layer may comprise one or more combinations, mixtures or co-polymerizations of these or other optical materials.

In a preferred embodiment, layers 10 and 20 may have similar basic chemistries, but may comprise different additives or components that give each layer identifiably disparate properties. For example, the distinctive absorption bands of photochromic dyes, or other visible dyes, pigments or tints, may clearly identify layers with similar chemistries (e.g., polyurea-urethanes) but identifiably disparate physical (optical) properties (e.g., dyed and clear layers).

In preferred embodiments, either or both layers may further comprise one or more additives. The additives may include materials that modify the polymeric structure of a layer or alter its physical, optical or chemical properties for better performance as an ophthalmic lens. Additives may also be included to increase the stability of a particular layer's properties, or to tailor them to a specific optical or physical performance. Preferred additives for any of these layers are selected from materials such as photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers and the like.

One or more of the layers may further comprise components that enhance appearance, or modify the performance or functionality of the layer or the composite constructed optical lens for particular eyewear lens use. In one preferred embodiment, one or more of the layers' components comprise a polarizer, which may be embodied as a film, wafer, supported film, coating, multilayer thin film coatings, multilayer polymeric film stack, wire grid, or an applied or embedded structure. Preferred polarizers are selected from linear, gradient linear, elliptical, circular or variable polarizers, and may comprise solid, mixed, multiple or gradient tints. In another preferred embodiment, one or more of the layers may include components such as displays, cameras, sensors, transmitters, receivers, electrical contacts, wireless devices, marks and decorations.

In another embodiment, the composite constructed optical lens may comprise additional optional layers or elements, as indicated by 40 in FIG. 1. These optional layers may be added to either or both layers 10 or 20, or to one or more locations of the lens 100. One or more of such added elements may comprise materials, substances, treatments, or coatings that tailor specific optical, chemical or physical performance. These added elements may also comprise one or more of the additives or components mentioned previously. In one preferred embodiment, components such as polarizers, displays, cameras, sensors, transmitters, receivers, electrical contacts, wireless devices, marks and decorations are included in additional optional layer(s) identified by element 40. These optional layers may comprise the same or different materials from other layers. In addition, if multiple optional layers 40 are added to lens 100, each discrete layer may comprise the same or different materials, additives and/or components.

Examples of optional applied coatings that may comprise optional element(s) 40 include hard coatings, hydrophobic coatings, anti-fog coatings, moisture-barrier coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings and UV light-filtering coatings and other coatings to tailor the optical, chemical or mechanical properties of the lens. Coatings may comprise one or more layers. For instance, multilayer interference coatings of dielectric, metal/dielectric or conductive/insulating materials can range from two to several hundreds of layers. In addition, one or more types of coatings may be used in combination to form element 40.

Optional treatments included as element 40 may be used to change the surface properties of the lens, and include such options as moisture barriers, anti-fogging and ease of cleaning treatments.

In one preferred embodiment, element 40 comprises a hard coating in combination with a multilayer interference coating to reduce visible and/or UV reflection (an AR coating), and may be placed on the surface of either or both layers 10 or 20. In another example, a multilayer interference coating designed to create a UV or visible spectral cut-off or notch in transmittance may be placed directly on one of the layers 10 or 20, or added as a separate layer to the composite lens 100. As another example, a multilayer interference coating or other filtering layer(s) or materials may be included on one of the layers 10 or 20, or added as a separate layer 40 to the composite lens 100 to effect the circular, elliptical, linear or variable polarization as mentioned previously.

In one preferred embodiment of the invention, layer 10 comprises thermoplastic polycarbonate. In another preferred embodiment, layer 20 comprises a polyurea-urethane material. In one preferred embodiment, the polyurea-urethane material of layer 20 further comprises at least one photochromic dye. In a further preferred embodiment, the polyurea-urethane material of layer 20 further comprises at least one photochromic dye and at least one UV absorber.

In a preferred embodiment, layer 10 comprises thermoplastic polycarbonate, and layer 20 comprises a polyurea-urethane material. In another preferred embodiment, the polyurea-urethane material of layer 20 further comprises at least one photochromic dye and/or at least one UV absorber.

In another preferred embodiment, layer 10 comprises a sulfur-containing polymer with a refractive index higher than about 1.56. In a more preferred embodiment, the sulfur-containing polymer of layer 10 has a refractive index higher than 1.59. In another preferred embodiment, layer 10 comprises a polyurea-urethane material.

In a preferred embodiment, the composite construct according to the invention further comprises element 40 applied to layer 20, and element 40 comprises a hard coating. In another preferred embodiment, the composite construct further comprises elements 40 applied to each of layer 20 and layer 10, and each of these applied elements 40 comprise a hard coating and an AR coating.

Layers 10 and 20 may each be uniform or non-uniform in thickness. Layers 10 and 20 may each be piano, or one or both layers may contribute optical power to the composite construct due to their thickness and curvatures. Layers 10 and 20 may each have curvatures that are spherical, aspherical, toroidal, asymmetrical, variable, progressive, multifocal, or combinations of any of these. Layers 10 and 20 may each comprise stepped, discontinuous or offset optical sections on their surfaces.

In a preferred embodiment, layers 10 and 20 extend together over a sufficient area to provide a composite structure over at least a practical vision zone of the lens. The "practical vision zone" of an eyewear lens is the area of the lens through which the wearer looks when the lenses are mounted in a frame and the eyewear are in normal use. This practical vision zone would commonly not be less than the normal size of the pupil (about 4-6 mm in diameter), and typically extends over much of the area of each framed lens. Given the variety of eyewear designs, the size of the framed lens may range in its dimensions from about 10 mm to about 80 mm in diameter, and the practical vision zone over which the composite structure of layers 10 and 20 extends may have similar or smaller dimensions. For instance, the practical vision zone of the lens may not extend to the edges of the eyewear frame because of lenticular lens designs, lens mounting constraints or fashion details, multifocal optical power distributions on the lens, or the placement of added components and features on one or more of the lenses (such as decorations, displays, cameras, sensors, transmitters and the like). In a preferred embodiment, the practical vision zone over which the invention's composite structure extends is a round region approximately centered on the pupil of the eye when the wearer is looking straight ahead through their eyewear. In one preferred embodiment, the practical vision zone is a round region approximately centered on the pupil of the eye and at least 18 mm in diameter. In another preferred embodiment, the practical vision zone is a round region approximately centered on the pupil of the eye and at least 28 mm in diameter. In a third preferred embodiment, the practical vision zone is an ellipse approximately centered over the pupil of eye, with a horizontal axis of at least 30 mm and a vertical axis of at least 18 mm. In another preferred embodiment, layers 10 and 20 of the invention's composite structure extend together over the central area of the lens and to within 5 mm of all edges of the lens. In another preferred embodiment, layers 10 and 20 extend together over the full diameter of the lens.

As shown in FIG. 1, the layers 10 and 20 of the composite constructed optical lens 100 of the invention may be of differing thicknesses. In another preferred embodiment, layers 10 and 20 may be of similar thicknesses. In a more preferred embodiment, layers 10 and 20 should have sufficient thickness that together their combined thickness in the final finished composite optical lens provides structural integrity to maintain the lens' optical power when in use. This is in contrast to prior art wafers, supported films and laminates, which typically are too thin to have the structural integrity necessary for an ophthalmic-quality eyewear lens and/or do not have corrective optical power. In general, layers 10 and 20 should be thicker than lens coatings, which commonly are less than about 50 micrometers thick. In a preferred embodiment, the layers are each at least 50 micrometers thick at their thinnest point and in a more preferred embodiment, are at least 100 micrometers thick. The layers 10 and 20 may be of uniform thickness, may be contoured to provide optical power, or may create or conform to shaped features of the lens (e.g., segmented and stepped structures, such as bifocals or trifocal sections). In a preferred embodiment, the thickness of each layer is in the range of about 100 micrometers to about 20 millimeters. In a more preferred embodiment, the thickness of each layer is in the range of about 100 micrometers to about 10 millimeters; and in another preferred embodiment, the thickness of each layer is in the range of about 100 micrometers to about 4 millimeters. In another preferred embodiment, layer 20 has a thickness in the range of about 200 micrometers to about 2 millimeters; in a more preferred embodiment, layer 20 has a thickness in the range of about 400 micrometers to about 1.5 millimeters.

In a preferred embodiment, the composite constructed lens 100 is a semi-finished lens blank and layer 10 has sufficient extra thickness to be processed into a range of prescription optical powers. In another preferred embodiment, the composite constructed lens 100 is a semi-finished lens blank and layer 20 has a thickness in the range of about 200 micrometers to about 2 millimeters; in a more preferred embodiment, layer 20 has a thickness in the range of about 400 micrometers to about 1.5 millimeters.

Another aspect of the invention is that the identifiably disparate layers are integrally bonded, i.e. there is interpenetrating bonding between the layers or bonding at the molecular level. The two disparate layers are in contact with each other and no separate applied layer intervenes between them. This contact area is shown schematically as element 30 in FIG. 1. Element 30 is not a discrete or separate structure of composite lens 100, but identifies the bonding interface with integral contact between layers 10 and 20. It is possible that near this region of contact between the disparate layers, due to the integral bonding between the layers, the chemical and/or physical structure has been changed such that it is not solely either the first or the second layers. For instance, there may be interpenetration of some residual non-reacted species or polymeric side-chains from one layer into the other. It is also possible that such interpenetration results in cross-linking between the layers, or reaction of some species from one layer with chemical species from the other layer.

For example, when polyurea-urethane materials are formed, it is not uncommon for a limited amount of —NCO groups to remain unreacted in the polymer structure. These groups are detectable by FT-IR spectroscopy in the 2300-2000 $cm^{-1}$ region, as shown in FIG. 2. These reactive species may bond with side-chains, —OH or —NH species, or entrapped or adsorbed water within the matrix of the at least one other layer of the composite structure, and thus join the layers together. In similar ways, other reactive groups or side chains may join or bond between the layers to effect integral bonding.

The interface indicated by 30 in FIG. 1 may be atomically thin and limited to single bond lengths between the two layers, or may comprise a relatively thicker region of cross-linking, reactive intermingling, interpenetrating polymeric networks and other forms of bonding. In addition, the type(s) of bonding may differ depending on the materials that form layers 10 and 20.

As indicated by the prior art, there may be several different ways to encourage bonding between the layers. Techniques and treatments include plasma, corona, flame or UV exposure; ionization; reactive or energetic gas exposure; ozone exposure; etching; ultrasonication; mechanical or chemical cleaning; thermal or infrared treatment; and other techniques. Such techniques may be used alone, in combination with each other, or in sequential processes to promote adhesion. They may be applied to either or both layers 10 and 20, or only to the interface 30 between the layers. In some instances, one or more selected techniques and processes may be used at one stage of production, and other techniques or combinations of techniques may be included at another stage. In whatever sequence(s) or form(s) chosen as effective and necessary, these techniques are then integrated into the total production process as additional process conditions to form the composite constructed lens product.

However, as further indicated by the many varied approaches described in the prior art, many of these techniques will not be successful in achieving integral bonding. The treatment techniques may need to be modified, replaced, added, omitted or otherwise changed depending on the specific nature of layers 10 and 20. In addition, the treatment techniques may need to be adjusted for better effect depending on the thickness(es), optical curvatures, and positioning of these layers within the invention's lens. Therefore, regardless of what various techniques and process conditions for adhesion promotion may be used, it is important to verify adhesion.

Standard methods for confirming and evaluating adhesion were found to be insufficiently demanding or not reliably discriminating for the desired high level of bond integrity needed for the composite constructed optical lens. Many standard tests evaluate bulk material properties and therefore are less sensitive to the stresses and possible failure modes of a layered composite. Other methods that probe peel strength or coating layer adhesion do not sufficiently mimic the forces or actions anticipated in use, or do not allow clear ranking of performance. Therefore, new techniques were required, and were developed to specifically evaluate the bond integrity of the composite constructed optical lens. The tests were also designed and optimized such that a ranking system could be established for comparative and quantitative judgment of the performance of the composite constructed lens. Using established, constant ranking systems, it is possible to compare and evaluate the quality of integral bonding for different composite constructed optical lenses. It is also possible to compare and quantitatively evaluate different production processes, so that a reasoned and analytically supported selection of optimized conditions can be selected for the best lens performance. The developed testing advantageously allowed rapid, rational sorting of various process conditions based on their effects on the integral bonding of the composite layers, leading to better optimization of the composite lens production.

It will be noted that a ranking of zero does not equate to total failure of adhesion between the layers; in fact, for each test, even a ranking of zero identifies a significant amount of adhesion between layers 10 and 20. However, with further research and development of the composite lens, it was recognized that even more robust levels of bonding were needed for this product. The test protocols were developed to assess bond integrity under much more demanding conditions than initial minimal adhesion. Mid-range rankings were correlated with at least sufficient bonding for the composite constructed lens to survive a wide range of normal lens processing conditions preparatory to mounting in frames. Higher rankings were correlated with assured bond integrity during initial processing, and higher resistance to extreme conditions in other accelerated testing or field tests. With these inputs, the test rankings were established as more discriminating indications of the advanced performance demanded by the inventors for these composite lenses.

A first practical test developed by the inventors to probe the adhesion of the layers of a composite constructed optical lens is the Aggressive Crib test. A semi-finished lens of the structure 100 is subjected to an aggressive edge cutting action that attempts to rapidly shear material off the diameter of the lens while the lens is rapidly rotated. This test uses an Optronics 2G generator with a two flare diamond cutter and the feed rate set to 110 (instead of a more typical speed of 60), to reduce the diameter of the semi-finished lens from about 76 mm to 65 mm by exerting excessive pressure and force against the edge of the lens. The edge of such lenses is typically about 10-20 mm thick, and the cutter moves back along the edge of the lens, cutting sequentially into the front of the lens, the edge of layer 20, the interface 30, the edge of layer 10, any layers at the back of the lens, and then reversing direction and cutting back through the edges of these layers toward the front of the lens. This forceful test can cause stress fracture within the layers, chipping at the interface between the layers, or delamination of the layers as propagated from the damaged edge. Delamination is a form of unacceptable damage characterized by propagation of adhesion failure beyond the contact point; the contact point may serve as a starting point for more extensive separation of the two layers.

A ranking system of adhesion quality was devised for the Aggressive Crib Test, as shown in Table 1, based on the width of delamination at an isolated edge damage site or the extent of delamination and its width around the periphery of the cribbed lens. The aggressive cribbing may cause a portion of the bonded layers to chip away together, but not propagate delamination into the rest of the interface 30. This is described as "chip to interface," and the extent of such chip damage is ranked because it indicates a bulk adhesion weakness. Intermediate rankings are assigned when the widths and extent of damage fall between the listed values in Table 1. A higher ranking indicates more robust and resilient bonding of the layers; a ranking of at least "3" or greater is expected for the composite constructed optical lens.

TABLE 1

Ranking of layer adhesion quality - Aggressive Crib Test

| Delamination width (mm) | Ranking |
| --- | --- |
| ≥2 all around the lens | 0 (poorest) |
| ≥2, more than 50% around periphery of lens | 1 |
| ≥2, less than 50% around periphery of lens | 2 |
| 1~2 all around the lens | 2.5 |
| 1~2, worst damage area | 2.75 |
| ≤1 all around the lens | 3 |
| chip to interface 30, 1~2 mm of both layers 10 and 20 removed, but no delamination | 3 |
| ≤1, worst damage area | 4 |
| chip to interface 30, ≤1 mm of both layers 10 and 20 removed, but no delamination | 4 |
| 0 | 5 (best) |

A second test developed for adhesion evaluation is the Knife Edge test. For this test, a semi-finished lens of composite construction such as shown in FIG. 1 with a nominal convex front surface of at least 1 Diopter curvature and contiguous layers 10 and 20 extending over at least a practical vision zone, and more preferably extending out to within 5 mm of all edges of the lens is used. The composite constructed semi-finished lens is surfaced and polished by standard optical lab techniques to a flat back curve and a center thickness less than the edge thickness of layer 20 (the layer of the composite constructed eyewear lens farther from the eye when in use). Because the two layers of the composite both extend together over at least a practical vision zone of the lens (and may extend together over much of the entire lens diameter), such surfacing from the back surface of the semi-finished composite constructed lens will first remove some material from layer 10, then grind into layer 20 at the edges of the lens, and then expose an edge of the interface 30 between the layers. It is called a "knife-edge" because in grinding and polishing a flat surface onto the back of a typical convex eyewear lens, the edges become extremely thin and sharp, like a knife's edge. This grinding, surfacing and polishing process may show adhesion problems between the two layers as areas of delamination along or between the exposed edge of cut layer 20, the interface and the remaining portion of layer 10.

Figure 3:
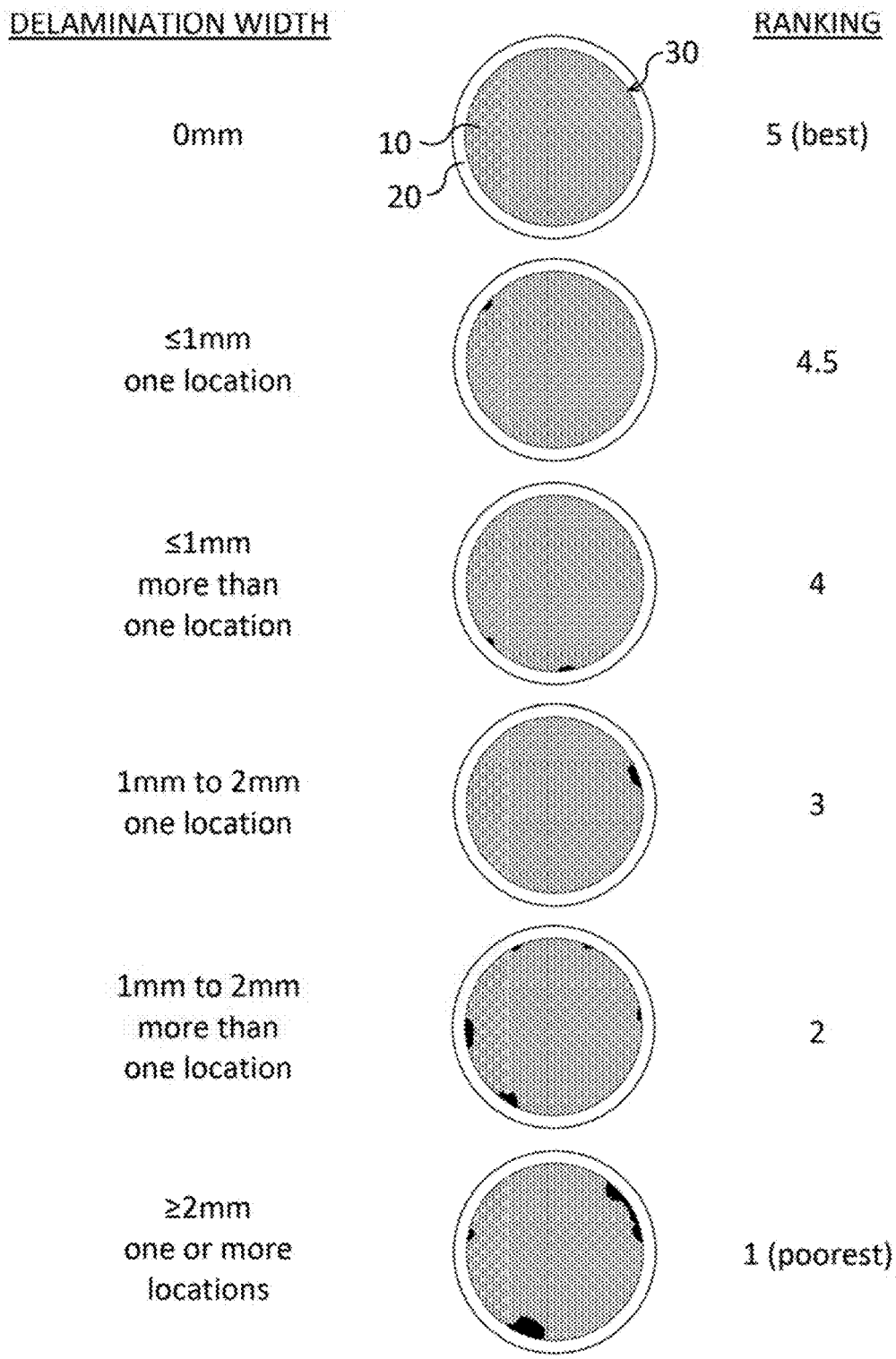
FIG. 3 illustrates the ranking system for layer adhesion quality associated with the Knife Edge test, as illustrated by the appearance of the tested lens.

FIG. 3 illustrates exemplary test lenses after being subjected to the Knife Edge test, and the ranking system that was devised to evaluate adhesion quality based on these test results. In each diagram in FIG. 3, layer 10 appears as the shaded portion and the light outer ring shows areas where the surfacing has cut through the interface 30 to expose layer 20 material alone. Delamination sites along the exposed interface 30 between layers 10 and 20 are shown as black regions in FIG. 3. The ranking system for the Knife Edge test is based on the maximum radial width of delamination (i.e., the extent across the diameter of test lens), and the number of delaminations along the periphery of the exposed edge of the layers' interface on the surfaced lens. Higher rankings identify less loss of adhesion between the layers during surfacing and are indicative of better resistance to damage during such initial processing of the lens. A ranking of at least "3" or greater is expected for the composite constructed optical lens.

A third test developed for layer adhesion evaluation of composite constructed optical lenses is the Screwdriver Delamination test. This is a destructive test that allows one to assess resistance to chipping and delamination at the interface of two layers of the composite. The test device is shown schematically in FIG. 4.

For this test, a semi-finished composite constructed optical lens is surfaced to a piano power configuration with a center thickness of 2.0-2.5 mm. The surfaced lens is then flat edged to the rimless shape of a SPERRY TOP-SIDER® (SR Holdings, LLC) P-65 design with a 55 mm lens size, but with +5.00 mm oversizing (the oversizing effectively yields an edged lens with a 60 mm maximum diameter, but with the same lens shape as the P-65 design). At the edge of the lens, the thickness of the outer composite layer (layer 20) is measured to give a percentage value vs. the entire surfaced lens thickness. The lens is then remounted in the edger, and a U-groove is cut into the edge of the lens, with the U-groove positioned according to the percentage value obtained previously. In other words, the groove is cut right at the interface 30 of layer 10 and layer 20, as shown for exemplary lens sample 101 in FIG. 4. (The U-groove is 0.6 mm wide and 0.6 mm deep, as typically used to contain the filament that secures the lens to the frame in this style.) Test lens sample 101 may comprise one or more additional optional layers and/or additional components, not shown in FIG. 4.

Figure 4:
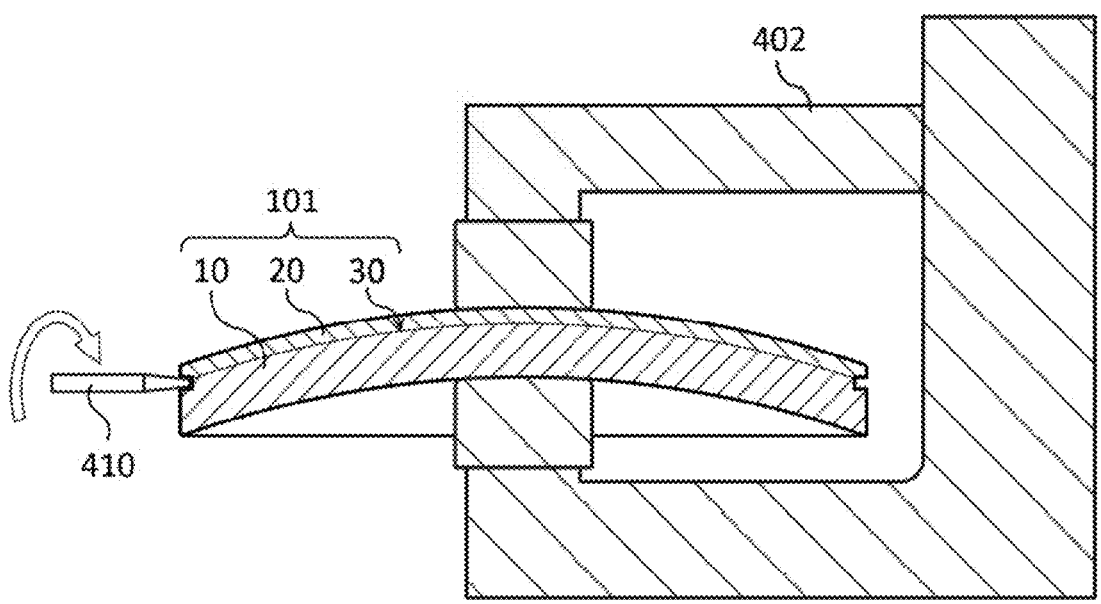
FIG. 4 shows a schematic drawing of the Screwdriver Delamination test device.

The surfaced, grooved test lens sample 101 is placed in fixture 402 and secured in a stationary position for the test by the fixture's round toggle clamp, which provides a 0.5 inch (~13 mm) diameter contact on the upper surface and a 0.75 inch (~19 mm) diameter contact on the lower surface of the lens (See FIG. 4 for lens orientation). The lens is positioned such that the test probe 410 will contact one of the longer sides of the roughly rectangular-shaped lens. Test probe 410 comprises a flat metal screwdriver with a size 3 blade (0.6 mm thick and 3 mm wide) mounted on a compressed air pressure-driven shaft that moves the probe into the lens groove to make full contact with the lens, and then rotates the screwdriver probe. The probe is inserted into the grooved edge of the prepared sample lens 101, and moved into a fully stopped position in the groove with a pressure of 50 psi. The probe is then rotated through about 90° by a pressure of about 100 psi compressed air coupled to the shaft of 410. The 90° rotation proceeds in a controlled rather than explosive manner, but takes less than 1 second. The lens edge is fractured as the screwdriver is rotated, and the fracture site is examined to determine the degree of adhesion between layers 10 and 20.

A ranking system of adhesion quality was devised as shown in Table 2 based on the width of damage propagated from the screwdriver contact point. Delamination, indicating both loss of adhesion between layers 10 and 20 and propagation of adhesion failure along interface 30 beyond the damage site, typically results in a lower ranking than when the rotation of the metal screwdriver eventually chips off the upper portion of the lens construct (layer 20). However, this chipped loss of adhesion is still noted as a weakness in overall performance.

If only the lower layer 10 is chipped and removed, it is judged an inadmissible test because the failure may be due to the groove not properly contacting both layers or to the fact that the force exerted in the test exceeded the strength of the lower layer, and is not the result of the composite construction. This is particularly true if layer 20 is known to be an impact resistant and resilient layer. If such a failure results, other replicate test results will be averaged for ranking the adhesion of the layers. In addition, the test will typically be repeated, often with a thinner layer 20 that might offer less intrinsic resistance to the force of the test and thus allow more assessment of the bond and interface between the two disparate layers.

The best ranking is given when the rotation of the screwdriver probe 410 does not cause delamination at the interface 30 or bulk removal of either layer, but merely exceeds the total strength of the composite constructed lens by chipping out a small portion of the entire construct. A ranking below "3" in the screwdriver delamination test is deemed a failure of the integral bonding adhesion desired for the composite constructed optical lens. Intermediate rankings may be assigned for widths of damage between the listed values in Table 2 For example, a ranking of 2.3 would mean that the width of delamination at the screwdriver contact site was between 2 mm and 3 mm, but closer to 2 mm (e.g., not more than 2.5 mm at its widest point). This was found to be a more demanding test of integral bonding between layers 10 and 20 than either of the previous two tests. It was found that the test protocol and its ranking system was capable of distinguishing finer differences among stronger adhesion levels, which allowed improved optimization of processes and final composite lens performance.

TABLE 2

Ranking of layer adhesion quality - Screwdriver Delamination Test

| Width of delamination around screwdriver contact site (mm) | Ranking |
|---|---|
| >8 | 0 (poorest) |
| 8 ≤ x ≤ 7 | 0.25-0.5 |
| 7 ≤ x ≤ 6 | 0.5-0.75 |
| 6 ≤ x ≤ 5 | 0.75-1.0 |
| 5 ≤ x ≤ 4 | 1.0-1.5 |
| 4 ≤ x ≤ 3 | 1.5-2.0 |
| 3 ≤ x ≤ 2 | 2.0-2.5 |
| 2 ≤ x ≤ 1 | 2.5-3.0 |
| <1 | 3 |
| big chip to interface 30 that removes layer 20 as a chip with width of 2-3 mm, no delamination | 3 |
| chip to interface 30 that removes layer 20 as a chip with width of <2 mm, no delamination | 4 |
| bulk chip of complete construct (both layers 20 and 10) | 5 (best) |

Figure 5:
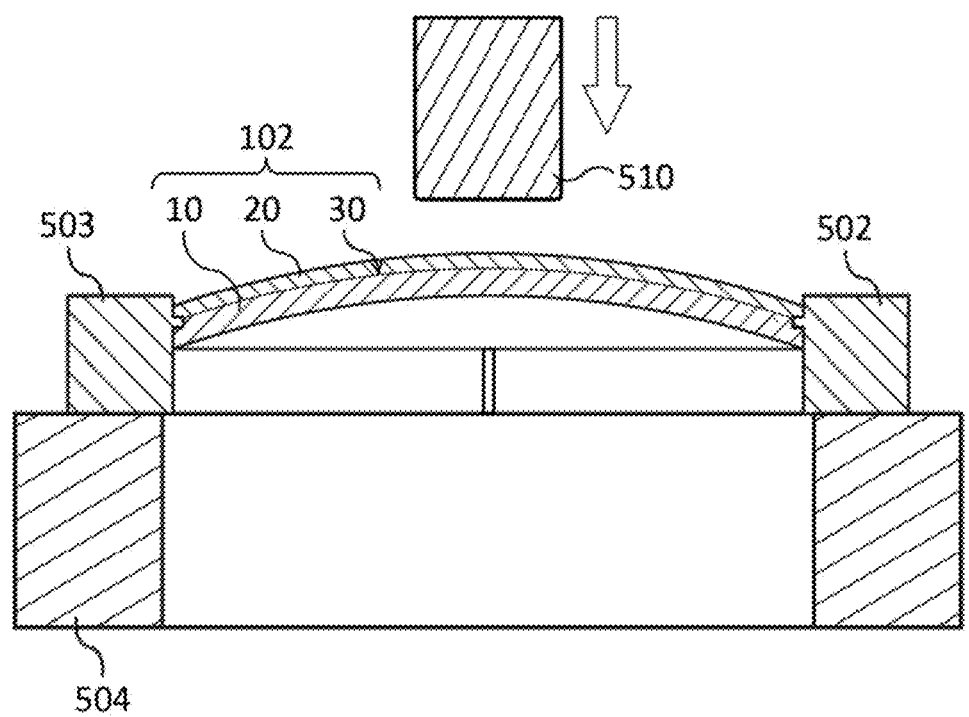
FIG. 5 shows a schematic drawing of the Pressure Delamination test device.

A fourth test developed for layer adhesion evaluation is the Pressure Delamination test. A composite constructed optical lens such as shown in FIG. 1, with a convex front surface base curve of approximately 4 Diopters or greater curvature, is surfaced to piano configuration with a 2.0-2.2 mm center thickness and edged to a round shape of 64.8 mm±0.1 mm diameter. The edge thickness of the front layer of the composite construct (layer 20) is measured and a U-groove (0.6 mm wide and 0.6 mm deep) is cut all around the edge at the interface 30 of layer 10 and layer 20. This surfaced and edge-grooved lens is shown as 102 in the schematic of the Pressure Delamination test fixture shown in FIG. 5. A raised, hollow, ring-shaped metal base 504 supports the holder for the test lens in this test device. Element 502 is a fixed, metal half-ring mount with a "u" protrusion to match the groove cut into the test lens 102. Element 503 is a removable, metal half-ring mount, also with a "u" protrusion to match the groove cut into the test lens. The test lens is positioned such that the lens' groove fits along the protrusion of element 502, and then element 503 is moved into position along the other half-circumference of test lens 102 and secured to hold test lens 102 firmly in place during the test. The two-part holding ring formed by elements 502 and 503 supports and secures the lens over more than 98% of its circumference. A pressurized piston 510 (powered by 60-psi air pressure applied to a metal cylinder of 25 mm diameter) descends a distance of approximately 25 mm in a controlled manner onto the outer surface of test lens 102, as indicated by the arrow of motion in FIG. 5. The force of this pressure, exerted over about one second, bends the lens and inverts it in the holding ring (typically with a loud "snap" sound). The air pressure on the piston is then released and the pressed, inverted lens reverts to its original shape.

This test puts extreme force along the entire edge circumference of the lens, and will highlight any weakness in adhesion that occurs along this stressed periphery. This type of damage might occur while shaping, edging or grooving the lens to the final frame shape; tensioning of the lens within the frame; or during impact of foreign bodies with the eyewear when in use. With very brittle lens materials, this pressure test can shatter the lens, and thereby identifies materials that cannot be used for final lenses.

A ranking system of adhesion quality as indicated by this test was devised as shown in Table 3. It is based on the width of damage created or propagated around the edge of the lens. Often, this Pressure Delamination test will cause separation of the layers along an extended periphery of the lens. The width of this delamination indicates how readily adhesion is lost between the layers when edge pressure is exerted on the lens. Higher rankings indicate that the lens will be more resistant to edge stress, and provide better lens integrity in such stressed conditions. A ranking of at least "3" or greater is expected for the composite constructed optical lens.

TABLE 3

Ranking of layer adhesion quality - Pressure Delamination Test

| Delamination width (mm) | Ranking |
|---|---|
| ≥3 all around the lens | 0 (poorest) |
| ≥3, extending ~50% around periphery of lens | 0.5 |
| ≥3, worst damage area | 1 |
| 2-3 all around the lens | 2.5 |
| 2-3, worst damage area | 2.75 |
| ≤2 all around the lens | 3 |
| ≤2, worst damage area | 3.5 |
| chip to interface that removes layer 20 as a chip with width ≤1 mm, no delamination | 4 |
| No damage | 5 (best) |

In practice, in any of these tests, all test lenses are ranked based on the results for the area of the test lens showing the worst damage. For best assurance of good adhesion of the layers of the composite construct, the inventors expect each test to yield a ranking that exceeds 3, indicating only a small amount of damage or adhesion loss under each of these extreme tests. Once significant increases in ranking are observed, the Screwdriver Delamination test and the Pressure Delamination test have been found to be more discriminating tests of even higher levels of adhesion; this allows further improvement of robust production processes and enhanced composite lens performance.

The inventors found that using these different tests provided excellent evaluation of adhesion and integral bonding as new composite constructed lenses were developed. These tests and rankings allowed much more discriminating determination of preferred process conditions, variables, operating ranges and control limits at the various stages of eyewear production, including original manufacture; subsequent coating or treatments; and surfacing, edging and mounting in frames. In addition, these tests and the ranking systems gave more informed and quantitative measures of robustness and performance for long-term use. This is very advantageous because the test results and accompanying guidance for further development or implementation is available in minutes to hours, rather than the typical days to months needed for environmental and field use studies. These unique and aggressive tests are designed specifically for integral bonding evaluation. The evaluation techniques can be applied to bonding of layers made from a wide range of materials, and with many different additives, coatings, components, and configurations. These innovations provided additional speed and reliability in evaluating and selecting production processes and viable, reliable composite constructions.

EXAMPLES

The invention will now be described in more specific detail with reference to the following non-limiting examples.

Example 1

Composite constructed optical lenses were prepared using two different production processes, A and B. Clear polycarbonate spherical 6B semi-finished lens blanks (75.8 mm diameter, approximately 10 mm thick) were first formed by standard injection-molding of optical grade thermoplastic polycarbonate. A layer of clear polyurea-urethane material, as described in U.S. Pat. No. 6,127,505 and modified and processed by techniques described in U.S. Pat. No. 7,002,744 B2, was reactively formed on the front (outer) surface of each clear polycarbonate blank (the polycarbonate blank corresponding to layer 10 in FIG. 1) using either production process A or production process B. In each process, the polyurea-urethane material was formed as a conformal piano power layer (corresponding to layer 20 in FIG. 1) over the entire surface of the polycarbonate lens blank. In production process A, layer 20 had a thickness of about 0.7-0.9 mm, while for production process B the thickness of layer 20 was in the range of 0.9-1.1 mm. In each of these production processes, the 2-layer composite structure extended over the entire surface and full diameter of each prepared composite lens product to form a semi-finished lens blank with a front surface convex curvature of ~6B. Seventy (70) lenses of each production process were reserved for the testing described below. The two layers could be easily identified as disparate from each other by FT-IR spectroscopy of each layer, as shown in FIG. 2.

Aggressive Crib Test. Twenty composite constructed optical semi-finished lens blanks made by production process A, and 20 composite constructed optical semi-finished lens blanks made by production process B, were subjected to the Aggressive Crib test described previously.

The adhesion between layers 10 and 20 was evaluated according to the ranking system detailed in Table 1. The ranking of each lens, based on the worst damage seen on each test lens, is listed in Table 4 below:

TABLE 4

Aggressive Crib test results for EXAMPLE 1

| lens ID | Composite constructed lens: Production Process A Aggressive Crib test ranking | Composite constructed lens: Production Process B Aggressive Crib test ranking |
|---|---|---|
| 1 | 0.9 | 5 |
| 2 | 2.75 | 5 |
| 3 | 3 | 5 |
| 4 | 2 | 5 |
| 5 | 2.9 | 5 |
| 6 | 0.8 | 5 |
| 7 | 2.5 | 5 |
| 8 | 2.5 | 5 |
| 9 | 1.8 | 5 |
| 10 | 1.3 | 5 |
| 11 | 1.5 | 5 |
| 12 | 1.5 | 5 |
| 13 | 5 | 5 |
| 14 | 5 | 5 |
| 15 | 5 | 5 |
| 16 | 5 | 5 |
| 17 | 5 | 5 |
| 18 | 5 | 5 |
| 19 | 5 | 5 |
| 20 | 5 | 5 |
| Average ranking: | 3.2 | 5.0 |

According to the ranking system for the Aggressive Crib test, production process B gave better adhesion between layers 20 and 10 than production process A. Test results were more variable and lower for production process A than for production process B, indicating that process B yielded a composite constructed lens with integral bonding that consistently withstood the aggressive crib test.

Knife Edge Test. Twenty composite constructed optical lens blanks made by production process A, and twenty composite constructed optical lens blanks made by production process B, were surfaced to knife-edged lenses, as described previously for the Knife Edge test, by grinding and polishing from the back of the lens through the clear polycarbonate layer 10 into the clear polyurea-urethane layer 20 of each lens. This yielded a flat-backed lens with a knife-edge exposure of the layers' interface 30 and portions of each of the layers.

The adhesion between layers 10 and 20 when subjected to this test was evaluated according to the ranking system detailed and illustrated in FIG. 3. The ranking of each lens, based on the worst damage seen on each test lens, is listed in Table 5 below:

TABLE 5

Knife Edge test results for EXAMPLE 1

| lens ID | Composite constructed lens: Production Process A Knife Edge test ranking | Composite constructed lens: Production Process B Knife Edge test ranking |
|---|---|---|
| 1 | 1 | 5 |
| 2 | 1 | 5 |
| 3 | 1 | 5 |
| 4 | 1 | 5 |
| 5 | 5 | 5 |
| 6 | 5 | 5 |
| 7 | 5 | 5 |
| 8 | 5 | 5 |
| 9 | 5 | 5 |

TABLE 5-continued

Knife Edge test results for EXAMPLE 1

| lens ID | Composite constructed lens: Production Process A Knife Edge test ranking | Composite constructed lens: Production Process B Knife Edge test ranking |
|---|---|---|
| 10 | 5 | 5 |
| 11 | 5 | 5 |
| 12 | 5 | 5 |
| 13 | 5 | 5 |
| 14 | 5 | 5 |
| 15 | 5 | 5 |
| 16 | 5 | 5 |
| 17 | 5 | 5 |
| 18 | 5 | 5 |
| 19 | 5 | 5 |
| 20 | 5 | 5 |
| Average ranking: | 4.2 | 5.0 |

According to the ranking system for the Knife Edge test, production process B gave better adhesion between layers 20 and 10 than production process A. Note that the Knife Edge test gave a higher average ranking than the Aggressive Crib test for adhesion maintained in composite lenses produced by process A.

By comparing the various test results for different production processes with the same lens materials for layers 10 and 20, and by reviewing the results for composites constructed of layers with different lens materials, the inventors recognized that the Knife Edge test may not be a sufficiently discriminating method to identify the higher integral bonding levels sought for the inventive composite lens products. The Knife Edge test may be used as a first indication of minimal required adhesion, but some of the other developed tests described herein may be more demanding and informative of the higher levels of adhesion required for the inventive lenses.

Screwdriver Delamination test. Twenty composite constructed optical lens blanks made by production process A, and twenty composite constructed optical lens blanks made by production process B, were surfaced to piano configuration in the shape described previously for the Screwdriver Delamination test. The thickness of layer 20 versus the thickness of layer 10 at the edge of each lens was measured, and used to set the position for the U-groove edge cut into that specific test lens. Each lens was placed in the test device as shown in FIG. 4, and subjected to screwdriver blade rotation as described. In order to obtain more data, each lens was removed from the toggle clamp mount 402 after first testing, and rotated 180° in the plane of the lens to present the other longer side of the rectangular-shaped lens to the test probe. The test lens was then repositioned in this new orientation in clamp mount 402, secured, and the test repeated with the screwdriver test probe 410 inserted and rotated in the groove on the second longer side of each test lens. The ranking for a given lens is based on the worst result (most damage observed) for these repeated tests on the same lens.

The adhesion between layers 10 and 20 when subjected to this test was evaluated according to the ranking system detailed in Table 2. The ranking of each lens, based on the worst damage seen on each test lens, is listed in Table 6 below:

TABLE 6

Screwdriver Delamination test results for EXAMPLE 1

| lens ID | Composite constructed lens: Production Process A Screwdriver Delamination test ranking | Composite constructed lens: Production Process B Screwdriver Delamination test ranking |
|---|---|---|
| 1 | 2.5 | 5 |
| 2 | 2.5 | 5 |
| 3 | 1 | 5 |
| 4 | 1.5 | 5 |
| 5 | 1.5 | 5 |
| 6 | 2.7 | 5 |
| 7 | 2.5 | 5 |
| 8 | 2.3 | 5 |
| 9 | 1.5 | 5 |
| 10 | 1.5 | 5 |
| 11 | 1.5 | 5 |
| 12 | 1.5 | 5 |
| 13 | 1.5 | 5 |
| 14 | 1.5 | 5 |
| 15 | 1.5 | 5 |
| 16 | 1.5 | 5 |
| 17 | 1.5 | 5 |
| 18 | 1.5 | 5 |
| 19 | — | 5 |
| 20 | — | 5 |
| Average ranking: | 1.8 | 5.0 |

During this test of production process A, the back layer 10 of lenses 19 and 20 chipped away from the screwdriver. Therefore, as described in the test protocol, these two results were not included in the evaluation of the replicate testing of this composite lens' bonding of layers 10 and 20.

According to the ranking system for the Screwdriver Delamination test, production process B gave much better adhesion between layers 20 and 10 than production process A. This severe test is more discriminating of the level of adhesion, and provides a more demanding test of robust integral bonding. Note that the range of rankings for a given replicated production process is more consistent than for the previous two tests. Table 2 showed that the ranking system for the Screwdriver Delamination test could identify finer increments in damage or in improvements in bonding. The lower values observed here for lenses of production process A support the inventors' discovery that this is a more discriminating test of adhesion for the composite constructed lenses.

Pressure Delamination test. Ten composite constructed optical lens blanks made by production process A, and ten composite constructed optical lens blanks made by production process B, were surfaced to piano configuration and edged with a U-groove positioned at the interface 30 of each lens as described previously for the Pressure Delamination test. When tested in the device shown in FIG. 5, the adhesion between layers 10 and 20 was evaluated according to the ranking system detailed in Table 3. The ranking of each lens, based on the worst damage seen on each test lens, is listed in Table 7 below:

TABLE 7

Pressure Delamination test results for EXAMPLE 1

| lens ID | Composite constructed lens: Production Process A Pressure Delamination test ranking | Composite constructed lens: Production Process B Pressure Delamination test ranking |
|---|---|---|
| 1 | 0 | 5 |
| 2 | 0 | 5 |
| 3 | 0.5 | 5 |

TABLE 7-continued

Pressure Delamination test results for EXAMPLE 1

| lens ID | Composite constructed lens: Production Process A Pressure Delamination test ranking | Composite constructed lens: Production Process B Pressure Delamination test ranking |
|---|---|---|
| 4 | 1 | 5 |
| 5 | 1 | 5 |
| 6 | 1 | 5 |
| 7 | 0.5 | 5 |
| 8 | 0 | 5 |
| 9 | 1 | 5 |
| 10 | 0 | 5 |
| Average ranking: | 0.5 | 5 |

The results clearly show that the differences in adhesion between layers 10 and 20 can be detected for different production processes by the Pressure Delamination test. In addition, the results clearly show that production process B yields composite constructed lenses with much stronger integral bonding than production process A. The inventors identified this unique test as a good evaluation technique for the high degree of bonding required for the composite constructed lens.

Example 2

Composite constructed optical lenses were prepared using other lens materials for layers 10 and 20, and other production process conditions, than those described in Example 1. In this Example, clear polyurea-urethane spherical 6B semi-finished lens blanks (75.8 mm diameter, approximately 8.5 mm thick) from material as described in U.S. Pat. No. 6,127,505, with modifications and methods as described in U.S. Pat. No. 7,002,744 B2, were reactively cast by two different production processes (designated Y and Z) to form layer 10 of the composite lens in this set of test lenses. Polyurea-urethane made with the same reactive species as used in layer 10, but with an added commercially available dye that gave a visible absorption peak near 550 nm (approximately 10 ppm of the dye added to the A side of the reactant mix), was reactively formed using an established production process into a dyed layer 20 on the front (outer) convex surface of each clear polyurea-urethane lens blank for these composite lenses. The dyed layer 20 on each lens was clearly identified by visual inspection and by visible spectroscopy as differentiable from layer 10 made by either production process Y or Z. In each case, layer 20 was formed as a conformal piano power layer with a thickness of about 0.7-0.9 mm, yielding a 2-layer composite structure extending over the full diameter of each prepared composite 6B lens product. Twenty lenses of each production process were reserved for the adhesion testing described below. For another gauge of repeatability, lenses 1-15 for each production process were each produced on the same day, while lenses 16-20 were each produced on a different day under the same production conditions as lenses 1-15.

Each of the composite constructed lens blanks were prepared and tested using the Screwdriver Delamination test, as described with reference to FIG. 4 and Table 2, to evaluate the integral bonding of each layered composite. The results of this testing are given in Table 8.

TABLE 8

Screwdriver Delamination test results for EXAMPLE 2

| lens ID | Composite constructed lens: Production Process Y Screwdriver Delamination test ranking | Composite constructed lens: Production Process Z Screwdriver Delamination test ranking |
|---|---|---|
| 1 | 2.5 | 5.0 |
| 2 | 2.5 | 5.0 |
| 3 | 2.5 | 5.0 |
| 4 | 2.5 | 5.0 |
| 5 | 2.6 | 5.0 |
| 6 | 2.6 | 5.0 |
| 7 | 2.6 | 5.0 |
| 8 | 2.6 | 5.0 |
| 9 | 2.6 | 5.0 |
| 10 | 2.6 | 5.0 |
| 11 | 2.9 | 5.0 |
| 12 | 3.0 | 5.0 |
| 13 | 3.0 | 5.0 |
| 14 | 3.0 | 5.0 |
| 15 | 5.0 | 5.0 |
| 16 (day 2) | 2.2 | 5.0 |
| 17 (day 2) | 2.2 | 5.0 |
| 18 (day 2) | 2.5 | 5.0 |
| 19 (day 2) | 2.5 | 5.0 |
| 20 (day 2) | 2.5 | 5.0 |
| Average ranking: | 2.7 | 5.0 |

The composite constructed lenses were prepared with different lens materials for layer 10 than the lenses described in Example 1, and yet even with these different materials, it is clear that the Screwdriver Delamination test gives discriminating and informative assessment of integral bonding between disparate layers. Production process Z clearly shows better and more consistent adhesion of the layers of the composite constructed lens than production process Y. Day-to-day variability in what should be repeated processes did not affect production process Z performance. Production process Y yielded more variable adhesion results, and while the second day's run was less variable, it appeared to have poorer adhesion that the other production day's lenses. Again, the Example demonstrates that the Screwdriver Delamination test may be helpful to identify robust and desired levels of integral bonding and therefore indicate better long-term product performance.

Example 3

Composite constructed optical lenses were prepared using another lens material for layer 10. In this Example, a thermoset polymer often referred to as "hard resin" and based on allyl diglycol carbonate chemistry, commercially available from PPG Industries, Inc. as tradename CR-607, was cast and prepared for composite construction by eight different production processes, designated A-HR through H-HR. Production process H-HR was used for a complete set of "control" lenses, in order to compare one previously selected production process against a variety of other production processes.

In this Example, these production processes were used to make clear CR-607 spherical 6B semi-finished lens blanks (76.5 mm diameter, approximately 9 mm thick) to form layer 10 of the composite constructed optical lens products. Then, clear polyurea-urethane material as described in U.S. Pat. No. 6,127,505 and U.S. Pat. No. 7,002,744 B2 was reactively cast to form layer 20 for each of these composite lenses. FT-IR spectroscopy clearly showed different absorption bands for the characteristic chemical species of the polyurea-urethane material of layer 20 (e.g., near 2260 cm$^{-1}$) as compared to the hard resin material of layer 10 (e.g., showing a characteristic CH$_x$ bending mode absorption near 1400 cm$^{-1}$ and a strong C=O stretch absorption near 1735 cm$^{-1}$). In each case, layer 20 was formed as a conformal plano power layer with a thickness of about 0.4-0.6 mm, yielding a 2-layer composite structure extending over the full diameter of each prepared composite lens product. Twenty lenses of production process H-HR were reserved for 1:1 comparison with twenty total lenses prepared by the other processes (typically, 2-3 composite lenses prepared by each of the other 7 production processes were used for these comparative evaluations).

Each lens was surfaced, shaped, grooved and tested for integral bonding of the composite constructed layers. The Screwdriver Delamination test method and device, as described with reference to FIG. 4 and Table 2, were used for this evaluation. The results for these hard resin/polyurea-urethane composite constructed lenses are given in Table 9.

TABLE 9

Screwdriver Delamination test results for EXAMPLE 3

| lens ID | Composite constructed lens: Various Production processes Screwdriver Delamination test ranking | Production Process | Composite constructed lens: Production Process H-HR Screwdriver Delamination test ranking |
|---|---|---|---|
| 1 | 1.5 | A-HR | 5.0 |
| 2 | 2.3 | B-HR | 5.0 |
| 3 | 2.5 | C-HR | 5.0 |
| 4 | 0.75 | D-HR | 5.0 |
| 5 | 1.3 | E-HR | 5.0 |
| 6 | 1.5 | F-HR | 5.0 |
| 7 | 0.6 | G-HR | 5.0 |
| 8 | 1.5 | A-HR | 5.0 |
| 9 | 2.0 | B-HR | 5.0 |
| 10 | 2.0 | C-HR | 5.0 |
| 11 | 2.5 | D-HR | 5.0 |
| 12 | 1.5 | E-HR | 5.0 |
| 13 | 1.5 | F-HR | 5.0 |
| 14 | 1.0 | G-HR | 5.0 |
| 15 | 0.4 | A-HR | 5.0 |
| 16 | 1.8 | B-HR | 5.0 |
| 17 | 0.5 | D-HR | 5.0 |
| 18 | 0.75 | E-HR | 5.0 |
| 19 | 1.5 | F-HR | 5.0 |
| 20 | 0.5 | G-HR | 5.0 |
| Average ranking: | 1.4 | | 5.0 |

The results demonstrate that the production process H-HR gives significantly stronger adhesion between the layers than any of the other production processes tested for this series of composite constructed lenses made of hard resin and polyurea-urethane materials.

Example 4

Composite constructed optical lenses were prepared using another lens material for layer 10, a clear thermoset high index (refractive index, n$_e$~1.67) polythiourethane lens material commercially available from Mitsui Chemicals, Inc. as MR-10®. This material was cast using standard semi-finished lens manufacturing processes, and prepared for composite construction by six different production processes, designated A-MR through F-MR. Layer 20 was formed on each of these semi-finished lens blanks (6B curvature, 76 mm diameter) by reactive casting of clear polyurea-urethane material as described in U.S. Pat. No. 6,127,505, with modifications and methods described in U.S. Pat. No. 7,002,744 B2 (including the addition to the A side of the reactant mix of about 10 ppm of a commercially available dye that gave a visible absorption peak near 550 nm), at a B:A reactant ratio of 0.96.

Another production process, G-MR, was used to prepare layer 10 for a complete set of twenty "control" lens blanks in order to compare a previously selected production process against the variety of other production processes. For this set of control composite lenses, the same reactants (including the added dye) were used to form the polyurea-urethane layer 20 of the composite constructed lens blank, but at a B:A reactant ratio of 0.85.

For all of the composite constructed lenses, the layers were identifiably disparate by visual inspection due to different refractive indices (MR-10, ~1.67; and the polyurea-urethane, ~1.53) and different visible color for the two layers.

The MR-10 material tends to be slightly more brittle than some other optical materials, so for these experiments, layer 20 was formed as a conformal layer 0.4-0.6 mm thick. Each of the lens blanks comprised of MR-10 material to form layer 10 via production processes A-MR through G-MR was approximately 10.5 mm thick. Each lens was surfaced, shaped, grooved and tested for integral bonding of the composite constructed layers. The Screwdriver Delamination test method and device, as described with reference to FIG. 4 and Table 2, were used for this evaluation.

The results for Screwdriver Delamination tests on these lenses are given in Table 10.

TABLE 10

Screwdriver Delamination test results for EXAMPLE 4

| lens ID | Composite constructed lens: Various Production Processes Screwdriver Delamination test ranking | Production process | Composite constructed lens: Production Process G-MR Screwdriver Delamination test ranking |
|---|---|---|---|
| 1 | 1.0 | B-MR | 4.3 |
| 2 | 1.5 | D-MR | 4.3 |
| 3 | 1.5 | D-MR | 5.0 |
| 4 | 1.5 | E-MR | 5.0 |
| 5 | 1.7 | C-MR | 5.0 |
| 6 | 2.0 | C-MR | 5.0 |
| 7 | 2.0 | B-MR | 5.0 |
| 8 | 2.0 | B-MR | 5.0 |
| 9 | 1.3 | A-MR | 5.0 |
| 10 | 1.9 | C-MR | 5.0 |
| 11 | 1.5 | D-MR | 5.0 |
| 12 | 1.5 | C-MR | 5.0 |
| 13 | 2.0 | C-MR | 5.0 |
| 14 | 2.0 | F-MR | 5.0 |
| 15 | 2.1 | F-MR | 5.0 |
| 16 | 2.2 | F-MR | 5.0 |
| 17 | 2.3 | F-MR | 5.0 |
| 18 | 2.5 | A-MR | 5.0 |
| 19 | 2.4 | F-MR | 5.0 |
| 20 | 2.8 | F-MR | 5.0 |
| Average ranking: | 1.9 | | 4.9 |

The results demonstrate that production process G-MR shows better adhesion of layers 10 and 20 in these composite constructed lens products than any of the production processes tested in A-MR through F-MR.

In preparation for Example 4, similar composite lenses constructed of MR-10 and polyurea-urethane were prepared, but with a thicker polyurea-urethane layer 20. In these preliminary tests, the Screwdriver Delamination test only chipped the back layer 10 (comprised of the polythiourethane material MR-10) of these composite constructed lenses, and could not provide reliable evaluation of the bond between the layers. Therefore, production process conditions were repeated but new composite constructed lens products were formed with the thinner layer 20 as noted in Example 4. The results show that testing with a thinner layer 20 gives more predictable information about the integral bonding between these particular layers for this embodiment of the invention's composite constructed lens. Interestingly, it was found that this test information was predictive of which production processes would provide good integral bonding even at greater thicknesses of either layer 10 or 20 for other, final composite constructed lens products comprising these lens materials (i.e., MR-10 and the polyurea-urethane material).

These examples demonstrate and evaluate the integral bonding of composite constructed lens products made from a variety of different lens materials used for layer 10 in combination with layer 20 comprised of polyurea-urethane. In addition, these examples describe identifiably disparate physical or chemical properties for layers 10 and 20 and for polyurea-urethane made with different additives and/or reactive conditions. Other combinations of materials, other layer thicknesses and other identifiably disparate layers are clearly within the scope of the invention.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein.

What is claimed is:

1. A composite eyewear lens product comprising at least a first layer of a first optical material and at least a second layer of a second optical material, said first and second layers providing a composite structure over at least a practical vison zone of the lens product, wherein the first and second layers are identifiably disparate, and wherein the first and second layers are integrally bonded to each other such that the adhesion of the first layer to the second layer exceeds a ranking of at least 3 when tested according to each of the methods of the Screwdriver Delamination test and the Pressure Delamination test.

2. The composite eyewear lens product as defined by claim 1, wherein only the first layer comprises thermoplastic polycarbonate.

3. The composite eyewear lens product as defined by claim 2, wherein the second layer comprises a polyurea-urethane optical material and one or more additives selected from the group consisting of photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers.

4. The composite eyewear lens product as defined by claim 1, wherein the second layer comprises one or more additives selected from the group consisting of photochromics, electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers.

5. The composite eyewear lens product as defined by claim 4, wherein the first layer further comprises one or more additives that are different from the one or more additives comprised in the second layer.

6. The composite eyewear lens product as defined by claim 1, wherein the second layer further comprises at least one photochromic.

7. The composite eyewear lens product as defined by claim 1, wherein the first layer further comprises a polarizer selected from the group consisting of linear, gradient linear, elliptical, circular and variable polarizers.

8. The composite eyewear lens product as defined by claim 1, wherein the first layer has a refractive index of at least 1.56 and comprises an optical material containing sulfur.

9. The composite eyewear lens product as defined by claim 1, wherein the identifiably disparate first and second layers comprise detectible differences that are measurable by analytical techniques selected from the group of Fourier transform-infrared spectroscopy, differential scanning calorimetry, thermogravimetric analysis, visible microscopy, and visible light spectroscopy.

10. The composite eyewear lens product as defined by claim 1, wherein the first optical material has a different chemical composition from the second optical material.

11. The composite eyewear lens product as defined claim 10, wherein the second optical material comprises a polyurea-urethane optical material and the second layer further comprises one or more additives selected from the group consisting of photochromics, electrochromics, thermochromics, pigments, dyes, tints, UV absorbers, UV reflectors, UV stabilizers, thermal stabilizers, IR reflectors, visible light filters, selective light reflectors, and selective light absorbers.

12. The composite eyewear lens product as defined by claim 10, wherein the first layer further comprises a polarizer selected from the group consisting of linear, gradient linear, elliptical, circular and variable polarizers.

13. The composite eyewear lens product as defined in claim 1, further comprising a coating selected from the group consisting of hard coatings, hydrophobic coatings, anti-fog coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings and UV light-filtering coatings.

14. The composite eyewear lens product as defined in claim 3, further comprising a coating selected from the group consisting of hard coatings, hydrophobic coatings, anti-fog coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, visible light-filtering coatings and UV light-filtering coatings.

15. The composite eyewear lens product as defined in claim 1, further comprising components selected from the group consisting of polarizers, displays, cameras, sensors, transmitters, receivers, electrical contacts, wireless devices and decorations.

16. The composite eyewear lens product as defined in claim 10, further comprising components selected from the group consisting of polarizers, displays, cameras, sensors, transmitters, receivers, electrical contacts, wireless devices and decorations.

17. The composite eyewear lens product as defined by claim 1, wherein the identifiably disparate first and second layers comprise detectible differences in one or more of chemical composition, physical phase changes, physical structure, and visible spectral response.

18. The composite eyewear lens product as defined in claim 1, wherein the lens is multifocal.

19. The composite eyewear lens product as defined in claim 1, wherein the second layer has a thickness in the range of about 200 micrometers to about 2 millimeters.

20. The composite eyewear lens product as defined in claim 11, wherein at least one of the additives comprised in the second layer is a photochromic.

* * * * *